(12) United States Patent
Bostick et al.

(10) Patent No.: US 10,230,805 B2
(45) Date of Patent: Mar. 12, 2019

(54) DETERMINING AND DISPLAYING USER AWARENESS OF INFORMATION

(71) Applicant: International Business Machines Corporation, Armonk, NY (US)

(72) Inventors: James E. Bostick, Cedar Park, TX (US); John M. Ganci, Jr., Cary, NC (US); Sarbajit K. Rakshit, Kolkata (IN); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 14/864,018

(22) Filed: Sep. 24, 2015

(65) Prior Publication Data

US 2017/0093993 A1    Mar. 30, 2017

(51) Int. Cl.
```
G06F 15/173    (2006.01)
H04L 29/08     (2006.01)
G06F 3/01      (2006.01)
H04L 12/58     (2006.01)
H04L 12/18     (2006.01)
H04N 21/466    (2011.01)
H04M 3/22      (2006.01)
H04L 29/06     (2006.01)
```

(52) U.S. Cl.
CPC .............. *H04L 67/22* (2013.01); *G06F 3/013* (2013.01); *H04L 51/34* (2013.01); *H04L 12/1813* (2013.01); *H04L 12/1831* (2013.01); *H04L 51/00* (2013.01); *H04L 51/04* (2013.01); *H04L 65/403* (2013.01); *H04M 3/2281* (2013.01); *H04N 21/4667* (2013.01)

(58) Field of Classification Search
CPC ..... H04L 12/1831; H04L 51/34; H04L 67/22; H04L 12/1813; H04L 51/00; H04L 51/04; H04L 65/403; H04N 21/4667; H04N 13/0484; H04N 7/15; G06F 3/013; H04M 3/2281; H04M 3/2218
USPC ............... 709/204, 205, 206, 207, 223, 224; 348/14.08
See application file for complete search history.

(56) References Cited

U.S. PATENT DOCUMENTS

| | | | | |
|---|---|---|---|---|
| 2005/0135281 | A1* | 6/2005 | Barclay | H04W 76/40 370/261 |
| 2010/0287023 | A1* | 11/2010 | Knobel | G06Q 10/06 705/7.13 |

(Continued)

FOREIGN PATENT DOCUMENTS

| | | |
|---|---|---|
| WO | 2008129356 A2 | 10/2008 |
| WO | 2010018459 A2 | 2/2010 |

OTHER PUBLICATIONS

Bednarik, Roman et al.; "Networked Eye-trackers in Shared Multimodal Collaboration"; University of Eastern Finland; Jan. 30, 2013; pp. 1-8.

(Continued)

*Primary Examiner* — Liang Che A Wang
*Assistant Examiner* — Johnny B Aguiar
(74) *Attorney, Agent, or Firm* — Stephanie L. Carusillo (57) ABSTRACT

One or more communications between two or more users are monitored. An activity by a first user is determined. The activity is related to one of the communications. A degree of awareness of the first user is determined. The degree of awareness is based on the determined activity.

11 Claims, 5 Drawing Sheets

(56) References Cited

U.S. PATENT DOCUMENTS

| | | | | |
|---|---|---|---|---|
| 2011/0196930 | A1* | 8/2011 | Chawla | G06Q 10/10 709/204 |
| 2012/0284640 | A1* | 11/2012 | Sloyer | G06Q 10/10 715/753 |
| 2013/0054622 | A1 | 2/2013 | Karmarkar et al. | |
| 2013/0124623 | A1* | 5/2013 | Munter | H04L 65/403 709/204 |
| 2013/0258042 | A1* | 10/2013 | Shun | H04L 67/22 348/14.08 |
| 2014/0099623 | A1 | 4/2014 | Amit et al. | |
| 2015/0042555 | A1 | 2/2015 | Vertegaal et al. | |
| 2015/0046233 | A1* | 2/2015 | Srulowitz | G06Q 10/06398 705/7.42 |
| 2015/0058428 | A1 | 2/2015 | Caskey et al. | |
| 2015/0154291 | A1* | 6/2015 | Shepherd | G06F 17/30861 707/748 |
| 2016/0073054 | A1* | 3/2016 | Balasaygun | H04N 7/15 348/14.08 |

OTHER PUBLICATIONS

Bednarik, Roman et al.; "Gaze cursor during distant collaborative programming: a preliminary analysis"; pp. 1-8.

Cohen, Isaac et al.; "Detecting and Tracking Moving Objects for Video Surveillance"; University of Southern California Institute for Robotics and Intelligent Systems; Copyright 1999 IEEE; pp. 319-325.

"Where work becomes teamwork"; Confluence; Copyright 2015 Atlassian; printed Jun. 9, 2015; pp. 1-5; <https://www.atlassian.com/software/confluence>.

Fussell, Susan et al.; "Using Eye-Tracking Techniques to Study Collaboration on Physical Tasks: Implications for Medical Research"; Human Computer Interaction Institute Carnegie Mellon University; Apr. 23, 2003; pp. 1-24.

MacDonald, Kevin; "IBM Notes and Domino Wiki: Lotus Notes: Creating a Notes TeamRoom"; Mar. 18, 2013; Version 6; Printed Jun. 16, 2015; <http://www-10.lotus.com/ldd/dominowiki.nsf/dx/Creating_a_Notes_TeamRoom>.

"Customer Action Management Features"; ProjectWare; Printed Jun. 9, 2015; <http://www.projectware.com/product.html>.

Rothganger, Fred et al.; "Segmenting, Modeling, and Matching Video Clips Containing Multiple Moving Objects"; pp. 1-35.

"TeamRoom is used by virually all of the 300,000+ IBM"; TeamSpace; Printed Jun. 16, 2015; pp. 1-3; <http://www.teamspace.ca/teamspace/teamspacewebsite.nsf/web/TeamRoom?open>.

* cited by examiner

DETERMINING AND DISPLAYING USER AWARENESS OF INFORMATION

BACKGROUND OF THE INVENTION

The present invention relates generally to the field of communicating information, and more particularly to determining whether users of information are aware of the latest communications.

Sharing information and data amongst a group of people may be easy with current technologies such as e-mail, software programs for word processing, spreadsheets, and presentations, instant messaging, team rooms, videoconferencing, etc. E-mail is an especially significant form of communication today. Worldwide, estimates indicate that there are close to two billion e-mails sent daily. Knowing whether a recipient received and read an e-mail may be important to a sender of the e-mail. Some e-mail programs include a 'return receipt' feature which notifies the sender that the recipient has received/opened the e-mail.

SUMMARY

Embodiments of the present invention include a method, computer program product, and system for determining user awareness of information. In one embodiment, one or more communications between two or more users are monitored. An activity by a first user is determined. The activity is related to one of the communications. A degree of awareness of the first user is determined. The degree of awareness is based on the determined activity.

DETAILED DESCRIPTION

Some embodiments of the present invention recognize that there is a vast amount of information and data used by various groups of people. Consider a group of five co-workers forming a team to complete a project; each team member is responsible for a different aspect of the project. One person may be the overall team leader, another responsible for finances, another responsible for technical aspects, another responsible for manufacturing, and another responsible for customer communication. Now, consider a late afternoon instant message chat between two of the members where a critical decision is made. That decision needs to be shared with the other three team members. Maybe an e-mail is sent to document the decision, if one of the two members remembers to send it. The possibility exists that not knowing about that one, critical decision may lead to a major mistake in the project resulting in a financial loss for the company, or worse, the loss of a job for one of the team members.

Embodiments of the present invention recognize that there may be a visual method to display, for each team member, the level of awareness of the relevant information affecting the team. At a glance, it will be obvious who is cognizant of the latest version of a document, who has read the meeting minutes from the most recent customer review, and who is aware of all of the decision points in the project. Knowing who is, and who is not, "up-to-speed" on relevant information and documentation may enable the project to run smoother, on schedule, and under budget. Company management, and more importantly customers, remain satisfied as the project is successfully completed.

Figure 1:
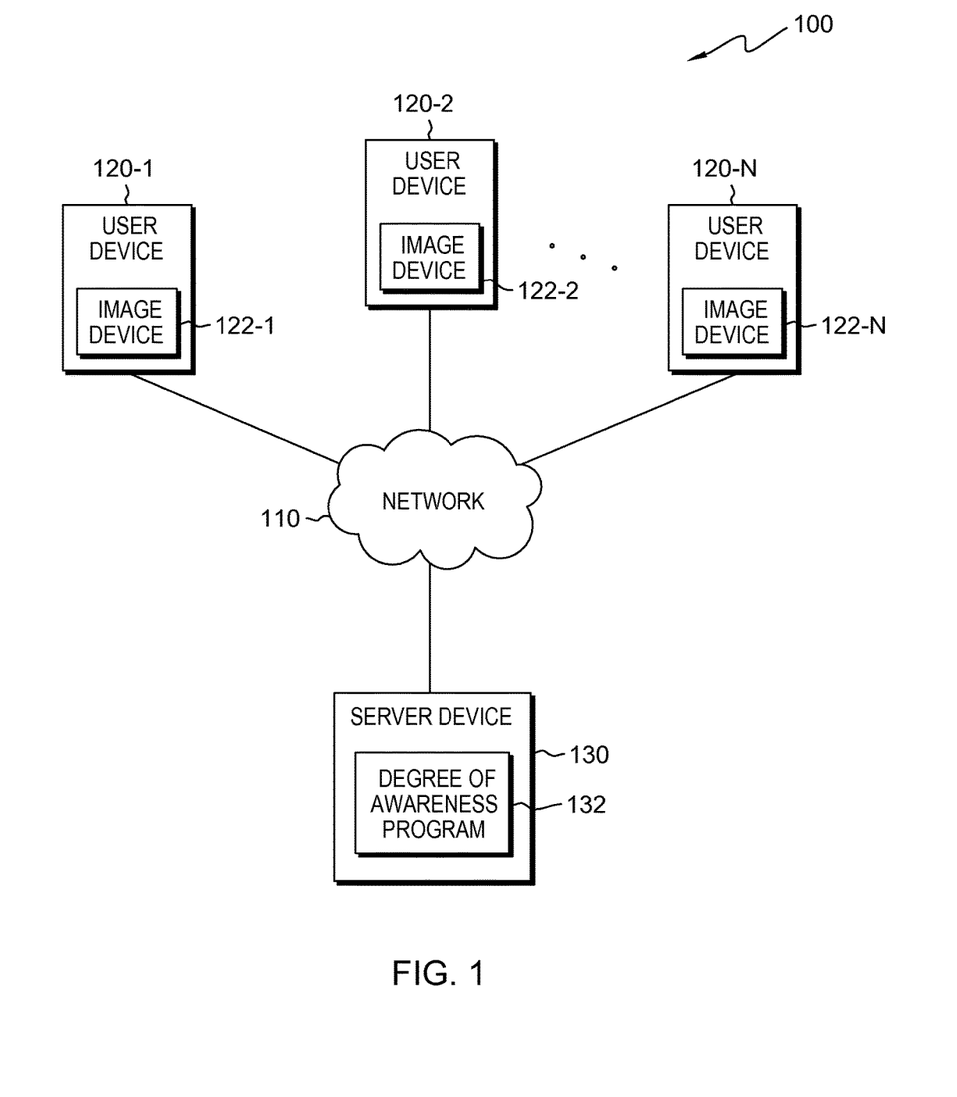
FIG. 1 is a functional block diagram of a computing environment, in accordance with an embodiment of the present invention.

The present invention will now be described in detail with references to the Figures. FIG. 1 is a functional block diagram of a computing environment, generally designated 100, in accordance with an embodiment of the present invention. FIG. 1 provides only an illustration of one implementation and does not imply any limitations with regard to the environments in which different embodiments may be implemented. Those skilled in the art may make many modifications to the depicted environment without departing from the scope of the invention as recited by the claims.

An embodiment of computing environment 100 includes any number of user device(s) 120 and server device 130 interconnected over network 110. In an example embodiment, utilizing network 110, user device 120-1 may communicate with any other user device 120 and server device 130, which in turn may communicate with any other user device 120. In example embodiments, computing environment 100 can include other computing devices not shown such as smartwatches, cell phones, smartphones, phablets, tablet computers, laptop computers, desktop computers, other computer servers or any other computer system known in the art.

In example embodiments, user device(s) 120 and server device 130 may connect to network 110 which enables user device(s) 120 and server device 130 to access other computing devices and/or data not directly stored on user device(s) 120 and server device 130. Network 110 may be a local area network (LAN), a telecommunications network, a wide area network (WAN) such as the Internet, or any combination of the three, and include wired, wireless or fiber optic connections. Network 110 may include one or more wired and/or wireless networks that are capable of receiving and transmitting data, voice, and/or video signals, including multimedia signals that include voice, data, and video information. In general, network 110 can be any combination of connections and protocols that will support communications between user device(s) 120 and server device 130, and other computing devices (not shown) within computing environment 100, in accordance with embodiments of the present invention.

In various embodiments of the present invention, user device(s) 120 may be a laptop, tablet or netbook personal computer (PC), a desktop computer, a personal digital assistant (PDA), a smartphone, or any other hand-held, programmable electronic device capable of communicating with any computing device within computing environment 100. In certain embodiments, user device(s) 120 represents a computer system utilizing clustered computers and components (e.g., database server computers, application server computers, etc.) that act as a single pool of seamless resources when accessed by elements of computing environment 100 (e.g., server device 130). In general, user device(s) 120 is representative of any electronic device or combination of electronic devices capable of executing computer readable program instructions. User device(s) 120 may include components as depicted and described in further detail with respect to FIG. 5, in accordance with embodiments of the present invention. Server device 130 is substantially similar to user device(s) 120 and has substantially similar components.

According to embodiments of the present invention, user device(s) 120 include image device(s) 122. Image device(s) 122 allows for the determination of the point of gaze of a user (i.e., where the user is looking) of user device(s) 120. In one embodiment, image device(s) 122 may be part of a microprojector which transmits an infrared (IR) beam at the eye, and a set of sensors receive the reflection patterns to determine eye position and movement. In another embodiment, image device(s) 122 may be a video camera which receives the reflection patterns from the eye. Video based eye trackers may track corneal reflection and the center of the eye's pupil, may track reflections from the front of the eye's cornea and the back of the eye's lens, or may track features inside the eye, such as retinal blood vessels, as the eye moves. In another embodiment, image device(s) 122 may take discrete photos rather than video. In general, image device(s) 122 is any device capable of tracking eye movement.

According to an embodiment of the present invention, server device 130 includes Degree of Awareness (DOA) Program 132. In other embodiments, DOA Program 132 may be found on any of the user device(s) 120 or on any other devices connected to network 110. In an embodiment of the present invention, DOA Program 132 collects relevant information directly from the monitored communications. The relevant data may include whether an e-mail, or any included attachments, were opened and how long either were open or viewed before being closed. In yet another embodiment, DOA Program 132 may work in conjunction with programs, applications, etc. found on user device(s) 120 to collect relevant data. In yet another embodiment, programs, applications, etc., found on user device(s) 120, may collect relevant data and provide it directly to DOA Program 132.

In example embodiments, DOA Program 132 may be a program, subprogram of a larger program, application, plurality of applications or mobile application software which determines and displays the level of user awareness of relevant information. Mobile application software, or an "app," is a computer program designed to run on smartphones, phablets, tablet computers and other mobile devices. In one embodiment of the present invention, DOA Program 132 monitors various forms of communication (e.g., e-mail, instant messages, team rooms, videoconferences, telephone calls/logs, etc.) utilized by a pre-defined group of users. DOA Program 132 may use natural language processing (NLP) to analyze the content in e-mail or other forms of communication in order to "understand" the context of the communication and assess which members of the group need to be aware of certain communications. In one embodiment of the present invention, DOA Program 132 tracks which users have opened which e-mails, documents, etc. and provides a summary report displaying which users may be "down-level" in terms of communication between group members. In the world of computers, down-level means using an earlier version of software, hardware, or an operating system. In embodiments of the present invention, down-level means a user is not aware of the most recent communication concerning a particular topic. In another embodiment, DOA Program 132 may provide notification to a particular user based on the role of the user and the content of the communication.

In an embodiment of the present invention, DOA Program 132 may integrate with project management software. Project management is the discipline of carefully projecting or planning, organizing, motivating, and controlling resources to achieve specific goals and meet specific success criteria. A project is a temporary endeavor designed to produce a unique product, service or result, with a defined beginning and end (usually time-constrained, and often constrained by funding or deliverables) undertaken to meet unique goals and objectives, typically to bring about beneficial change or added value. The temporary nature of projects stands in contrast with business as usual operations, which are repetitive, permanent, or semi-permanent functional activities to produce products or services. In practice, the management of these two systems is often quite different, and as such requires the development of distinct technical skills and management strategies. The primary challenge of project management is to achieve all of the project goals and objectives while honoring the preconceived constraints. The primary constraints are scope, time, quality and budget. The secondary—and more ambitious—challenge is to optimize the allocation of necessary inputs and integrate them to meet pre-defined objectives. DOA Program 132 may track user awareness of pre-defined project milestones (i.e., goals, achievements) for the duration of the project.

Figure 2:
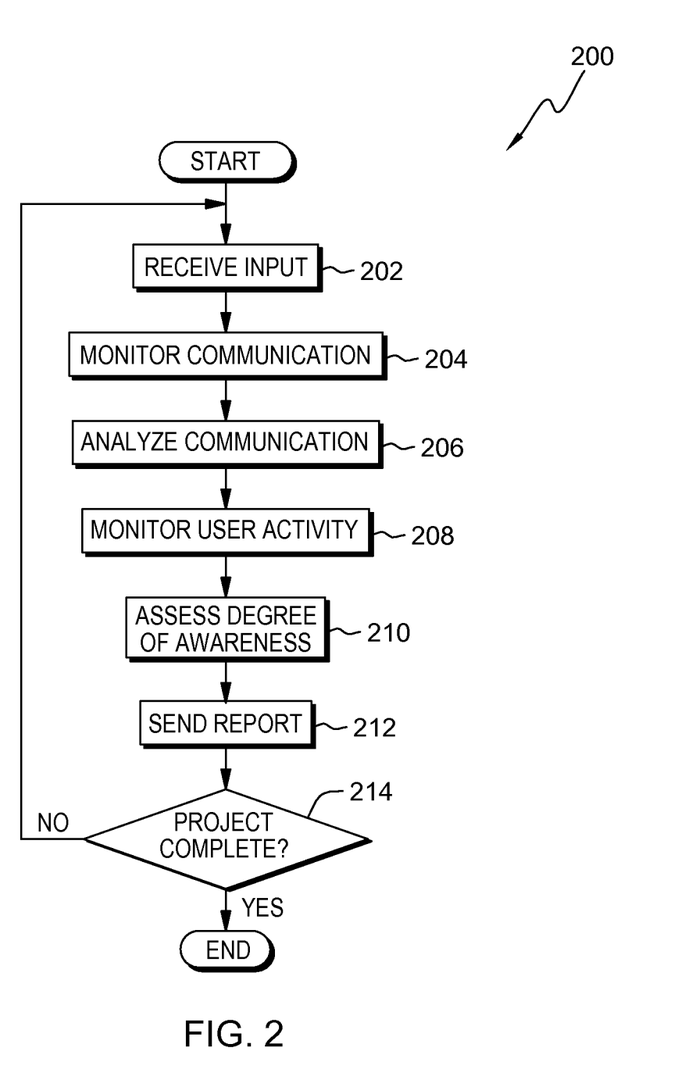
FIG. 2 is a flowchart depicting operational steps of a program that functions to determine and display the level of user awareness of relevant information, in accordance with an embodiment of the present invention.

FIG. 2 is a flowchart depicting operational steps 200 of Degree of Awareness (DOA) Program 132, on server device 130, within computing environment 100 of FIG. 1, a program that functions to determine and display the level of user awareness of relevant information, in accordance with an embodiment of the present invention. In one embodiment, DOA Program 132 performs the operational steps. In an alternative embodiment, any other program, while working with DOA Program 132, may perform the operational steps. In an embodiment, DOA Program 132 may invoke operational steps 200 upon the request of a user. In an alternative embodiment, DOA Program 132 may invoke operational steps 200 upon the passage of a time interval or the opening of an e-mail client by a user.

Figure 3A:
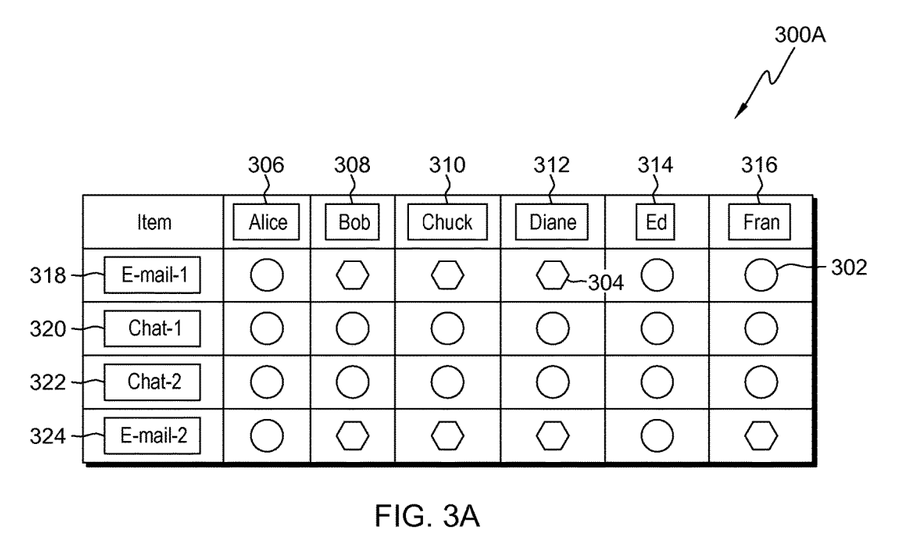
FIGS. 3A and 3B are exemplary examples of a periodic awareness report, in accordance with an embodiment of the present invention.

One example of a report used to display the level of user awareness is example report 300A shown in FIG. 3A. When sent, this example report includes six users—Alice 306, Bob 308, Chuck 310, Diane 312, Ed 314, and Fran 316 and four items (i.e., communication events)—E-mail-1 318, Chat-1 320, Chat-2 322, and E-mail-2 324. Concerning E-mail-1 318 (the e-mail from Fran 316 indicating the change to the completion data), DOA Program 132 determined that Bob 308, Chuck 310, and Diane 312 were down-level. In this example, circle 302 indicates the user is aware of the item and hexagon 304 indicates the user is down-level. For simplicity, throughout the rest of the specification Alice 306, Bob 308, Chuck 310, Diane 312, Ed 314, and Fran 316, as found in FIG. 3A and FIG. 3B, will be referred to only as Alice, Bob, Chuck, Diane, Ed, and Fran, respectively.

Figure 3B:
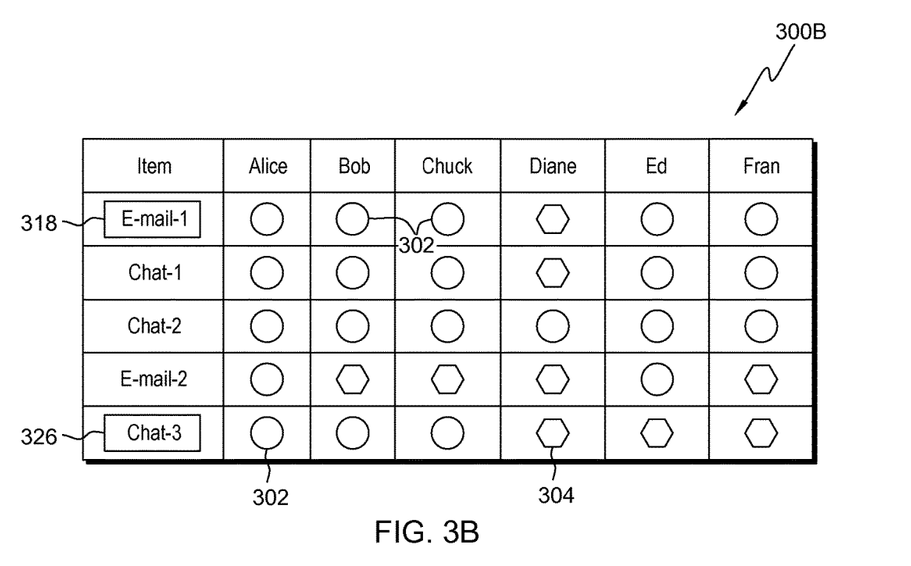

Subsequent reports may show additional users and/or items if changes have occurred prior to the sending of the new report. Example report 300B, in FIG. 3B, shows Chat-3 326 has taken place and has been added to the report. Chat-3 326, between Alice, Bob, and Chuck concerned the new project completion date. Since the chat took place between Alice, Bob, and Chuck, the three are shown as aware of the chat via the circle 302 indicator while Diane, Ed, and Fran are shown down-level via hexagon 304. In the chat, Alice informed Bob and Chuck of the date change. Consequently, Bob and Chuck are no longer down-level regarding the date change; the fact that the two of them are no longer down-level is reflected in the updated status of E-mail-1 318 shown in FIG. 3B. The ability to update a past communication item (e.g., E-mail-1 318), based on a new communication item (e.g., Chat-3 326), is an example of the NLP capability of DOA Program 132. Bob and Chuck were not aware of E-mail-1 318 but they were made aware of the content of the e-mail via Chat-3 326; for this reason, the awareness of Bob and Chuck is no longer down-level for communication E-mail-1 318 as shown by circle 302.

In an embodiment of the present invention, updated communication items such as E-mail-1 318 may be shown in bold font or another color to distinguish it from items that were not updated. Other embodiments may incorporate colored shapes such as a red hexagon to indicate down-level. Additionally, the "Item" column may include a hyperlink to the actual item which enables a user to determine details regarding the item. If a user clicks the link, DOA Program 132 may update the awareness of the user. Further, other shapes and colors may be included, such as a yellow triangle indicating a user has received, but not yet opened, an e-mail.

Figure 4:
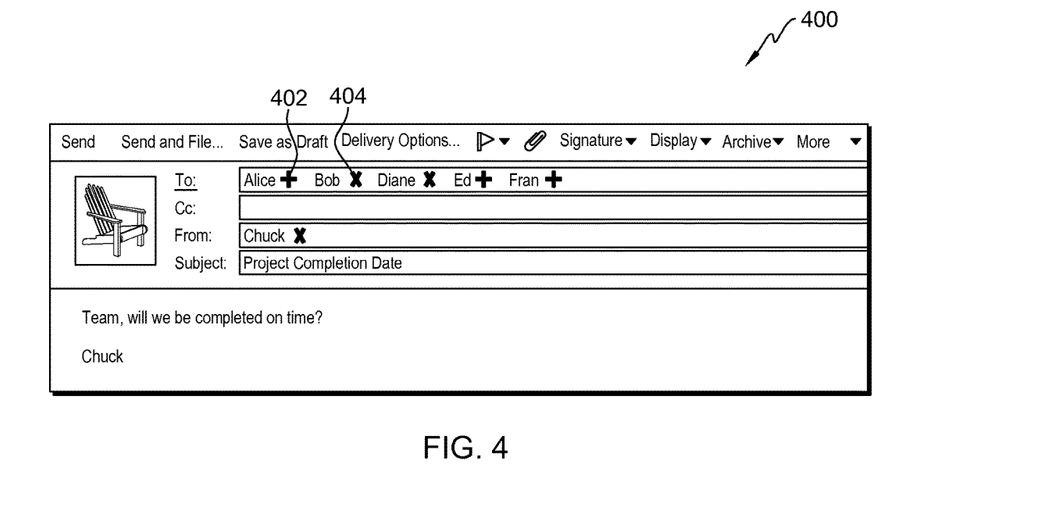
FIG. 4 is an exemplary example of an awareness report based on a composed e-mail, in accordance with an embodiment of the present invention.

In another embodiment, a report may be created when a user opens an e-mail client to compose an e-mail to another team member or members. In this embodiment, DOA Program 132 may use NLP to analyze the subject line as well as the actual contents of the e-mail and then determine the awareness of the members on distribution for the e-mail. For example, Chuck may compose an e-mail concerning the completion date of the project. The subject line for the e-mail may be 'Project Completion Date' and the body may include the phrase 'completed on time'. DOA Program 132 may use NLP to determine that the e-mail concerns a change in the completion date of the project and subsequently displays a status showing that Bob, Chuck, and Diane are down-level regarding all available communication regarding the project completion date. An example of this report, example 400, is shown in FIG. 4. In this example, plus (+) sign 402 indicates a user is aware of the item while letter X 404 indicates the user is down-level. Those skilled in the art may determine additional formats for the report.

In yet another embodiment, if integrated with a project management tool, DOA Program 132 may send a report at the completion of certain project milestones. For example, a project may include phases such as feasibility verification, reliability testing, and production qualification; in this example, DOA Program 132 may send a report after each of the three phases. In one embodiment, the report may include only the defined milestones while in another embodiment, the report may include all communication defined during the configuration.

DOA Program 132 receives input (step 202). In other words, DOA Program 132 receives configuration input for a group of users. Configuration data may include the following: user names; user roles; user responsibilities; and changes to original input (e.g., addition of new user or deletion of existing user). In one embodiment, a user inputs configuration data to DOA Program 132 on server device 130 over network 110 using user device(s) 120. For example, a user, at a place of employment, uses a desktop computer to input the following configuration data to DOA Program 132: Alice, team leader, ensure on-time/on-budget completion of project; Bob, finance manager, monitor project costs; Chuck, development engineer, provide technical support to solve problem; Diane, manufacturing engineer, ensure project is feasible using manufacturing line; Ed, quality engineer, verify that any process change is repeatable and meets product requirements; and Fran, customer liaison, communicate project status with customer. In other embodiments, additional configuration input data may include: types of communication to be monitored (e.g., e-mail between group members, including attached documents, instant message sessions between group members; team rooms; team software or databases used for the project; project management programs/applications; videoconferences; phone calls; phone logs; etc.); project time frame; whether communication marked private or confidential is monitored; frequency of reporting; and type(s) of report to be provided.

DOA Program 132 monitors communication (step 204). In other words, DOA Program 132 monitors the various forms of communication (previously defined during configuration input) between members of the group. In an embodiment of the present invention, DOA Program 132 monitors e-mail traffic, between project group members (i.e., user device(s) 120), over network 110. For example, DOA Program 132 determines that Fran sends an e-mail to a portion of the group.

DOA Program 132 analyzes communication (step 206). In other words, DOA Program 132 employs natural language processing (NLP) in order to "understand" the various forms of communication and determine that the communication was provided to the correct team member(s). In simple terms, NLP is the ability of a computer to understand what a human is 'telling' it, either in written or spoken form. More formally, NLP is a field of computer science, artificial intelligence, and computational linguistics concerned with the interactions between computers and human (natural) languages. As such, NLP is related to the area of human-computer interaction. Many challenges in NLP involve natural language understanding, that is, enabling computers to derive meaning from human or natural language input. In one embodiment of the present invention, DOA Program 132 analyzes communication over network 110 between the various users of user device(s) 120. For example, DOA Program 132 analyzes the e-mail sent by Fran and determines that the e-mail includes discussion regarding a revised, earlier completion date for the project (i.e., the project completion date was moved in to October $1^{st}$ from the original date of November $1^{st}$). Since this is a global change to the project, DOA Program 132 determines that all group members in the project should be aware of this communication.

In another embodiment, DOA Program 132 analyzes data, which may be included in various forms of communication, such as document file names, document dates, and version numbers. For example, DOA Program 132 may determine that two documents, found in different communications, are identical based on each having the same file name, data and version number. Alternatively, DOA Program 132 may determine two documents to be different if they have the same file name but different dates associated with the file. This enables DOA Program 132 to determine a user is down-level for a given document if the user has received a version of the document dated Jul. 1, 2015 but has not received the version dated Aug. 6, 2015.

DOA Program 132 monitors user activity (step 208). In other words, DOA Program 132 monitors the communication between users previously defined during the project configuration. In an embodiment of the present invention, DOA Program 132 determines an e-mail was sent from user device 120-1 to all other user device(s) 120, with the exception of user device 120-3 (not shown), determines that those users received the e-mail, and determines which user(s) opened the e-mail. For example, regarding the e-mail sent by Fran, DOA Program 132 determines Alice, Bob, Diane and Ed received the correspondence, Chuck did not, and that everyone who received it, with the exception of Diane, read it.

In another embodiment, DOA Program 132 analyzes whether a user opened a document. In addition, if opened, DOA Program 132 also determines the length of time the document remained open. These two data points provide an indication of the degree of awareness a user has for a particular document. For example, concerning the e-mail Fran sent to the team, DOA Program 132 determined that Alice, Bob, and Ed all opened the e-mail; DOA Program 132 also determined that each spent between six and seven minutes with the e-mail open before closing it. In addition, DOA Program 132 noted that Diane received the e-mail but did not open it and that Chuck did not receive the e-mail.

In yet another embodiment, DOA Program 132 tracks the eye gaze of a user, via image device(s) 122, and an associated gaze tracking program (not shown), in order to determine that the user is aware of a given communication by ensuring the eyes of the user remain on the communication. The gaze tracking program is any set of program instructions capable of determining the point of gaze of a user with input from an image device, such as image device(s) 122. For example, concerning the e-mail opened by Alice, Bob, and Ed, DOA Program 132 was able to determine, via image device(s) 122, that Alice and Ed were looking at the display (not shown) of their respective user device(s) 120 during the six to seven minutes the e-mail was open which indicates each of them was reading the e-mail. However, DOA Program 132 determined that Bob was not looking at the display (not shown) for his user device(s) 120 during the six to seven minutes he had the e-mail open; this indicates that his attention was elsewhere and that he may not have read the e-mail sufficiently well to be aware of the contents.

DOA Program 132 assesses the degree of awareness (step 210). In other words, DOA Program 132 uses the results determined in the earlier steps to determine or assess the degree of awareness of the various team members for a given communication. In an embodiment of the present invention, DOA Program 132 integrates the various determinations made regarding the communication between team members in order to assess the degree of awareness of the team members. For example, DOA Program 132 has previously determined that all team members should have received the e-mail from Fran regarding the change to the project completion date. DOA Program 132 assesses that Chuck is down-level due to the fact that he did not receive the e-mail. DOA Program 132 also assesses that Diane is down-level because even though she received the e-mail from Fran, she did not open it. DOA Program 132 further assesses that Bob is down-level because even though he received and opened the e-mail from Fran, his attention was elsewhere, as determined by the eye gaze component of DOA Program 132, during the time the e-mail was open. DOA Program 132 further assesses that Alice and Ed are not down-level regarding the change to the project completion date because both have received the e-mail, had the e-mail open for a sufficient amount of time to fully read it, and their attention was directed to the e-mail as determined by the gaze component of DOA Program 132.

DOA Program 132 sends a report (step 212). In other words, DOA Program 132 previously determined the degree of awareness of the group members, creates a report indicating the results, and sends the report. In one embodiment of the present invention, DOA Program 132 sends a report over network 110 to user device(s) 120. In one embodiment, the report may be automatically sent based on the passage of a time interval (e.g., daily, weekly, monthly, etc.) and the report may be sent to all members of the team or only to members who are down-level for some communication(s). For example, DOA Program 132 sends a report weekly to Alice, Bob, Chuck, Diane, Ed, and Fran. In other embodiments, the report may be provided upon the opening of an e-mail client or when requested by a user.

DOA Program 132 determines whether the project is complete (decision step 214). In other words, DOA Program 132 determines whether a user has input an indication that the project is complete and that DOA Program 132 should be closed. In one embodiment (decision step 214, NO branch), DOA Program 132 does not receive an indication from a user (i.e., team member) that the project is complete; therefore, DOA Program 132 continues to receive any updated input (e.g.; a new member has joined the team) and monitor communication regarding the project. In another embodiment (decision step 214, YES branch), DOA Program 132 receives an indication that the project is complete; therefore, DOA Program 132 terminates.

Figure 5:
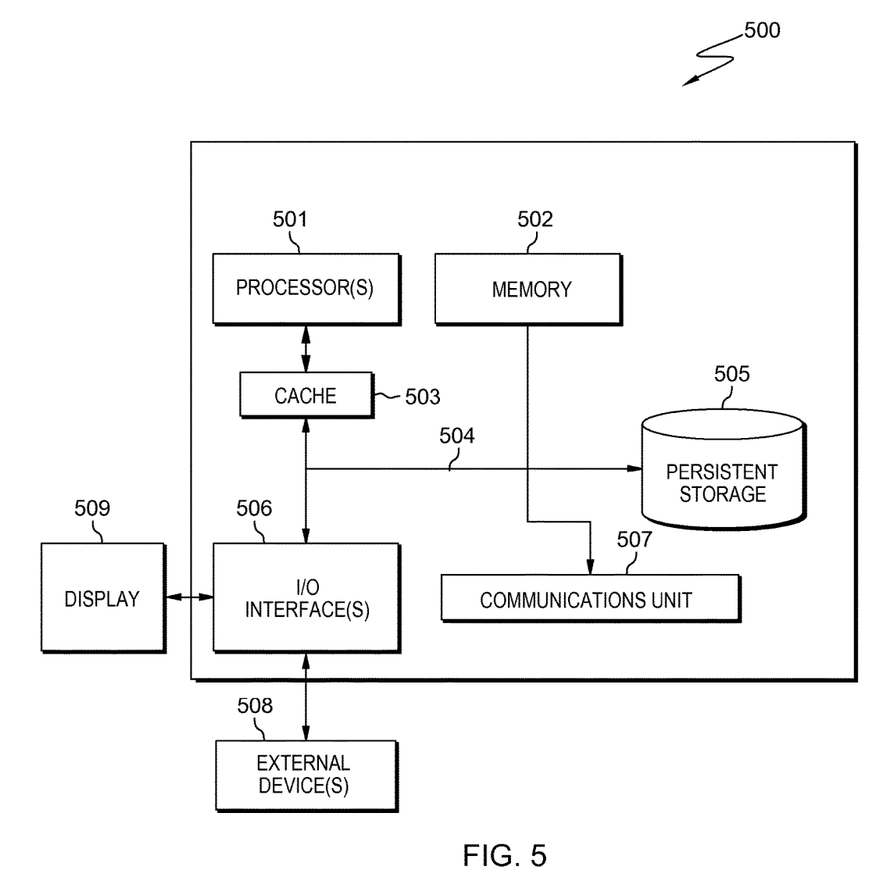
FIG. 5 depicts a block diagram of the components of a computing system representative of the user device(s) and server device of FIG. 1, in accordance with an embodiment of the present invention.

FIG. 5 depicts computer system 500 which is an example of a system that includes DOA Program 132. Computer system 500 includes processors 501, cache 503, memory 502, persistent storage 505, communications unit 507, input/output (I/O) interface(s) 506 and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 allows for input and output of data with other devices that may be connected to each computer system. For example, I/O interface 506 may provide a connection to external devices 508 such as a keyboard, keypad, a touch screen, and/or some other suitable input device. External devices 508 can also include portable computer readable storage media such as, for example, thumb drives, portable optical or magnetic disks, and memory cards. Software and data used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining user awareness of information, the method comprising:
    monitoring, by one or more processors, one or more communications between a pre-defined group of user profiles working on a project;
    identifying, by the one or more processors, a first communication of the one or more communications between a first at least two user profiles of the pre-defined group;
    identifying, by the one or more processors, using natural language processing, a first content of the first communication related to the project;
    determining, by the one or more processors, a degree of awareness to the first content of the first communication for each user profile of the pre-defined group, wherein the degree of awareness for a respective user profile is selected from the group consisting of the respective user profile was included in the first communication, the respective user profile opened the first communication, the respective user profile opened and read the first communication, and the respective user profile was not included in the first communication;
    creating, by the one or more processors, a log for the first content, wherein the log identifies the first communication, the first at least two user profiles, and the degree of awareness of the first content for each user profile of the pre-defined group;
    identifying, by the one or more processors, a second communication between a second at least two user profiles of the pre-defined group;
    identifying, by the one or more processors, using natural language processing, a second content of the second communication related to the project;
    determining, by the one or more processors, that the second content of the second communication matches the first content of the first communication;
    responsive to determining that the second content matches the first content, adding, by the one or more processors, the second communication and the second at least two user profiles to the log for the first content;
    determining, by the one or more processors, that the degree of awareness for one of the user profiles of the pre-defined group has changed;
    responsive to determining that the degree of awareness for one of the user profiles has changed, updating, by the one or more processors, the log for the first content to reflect the change in the degree of awareness; and
    sending, by one or more processors, the log to the pre-defined group of user profiles.

2. The method of claim 1, wherein determining the degree of awareness for each user profile of the pre-defined group in regards to the first content of the first communication, comprises:
    determining, by the one or more processors, a length of time that the first communication is opened by each user profile of the pre-defined group.

3. The method of claim 1, wherein determining the degree of awareness for each user profile of the pre-defined group in regards to the first content of the first communication, comprises:
    determining, by the one or more processors, a length of time that the first communication is viewed by each user profile of the pre-defined group, wherein the length of time is determined by tracking an eye gaze of each user profile of the pre-defined group.

4. The method of claim 1, wherein the first communication and the second communication are selected from the group consisting of: an e-mail; an e-mail attachment; an instant messaging conversation; a telephone log; a telephone call; and a text message conversation.

5. A computer program product for determining and displaying user awareness of information, the computer program product comprising:
    one or more computer readable storage media; and
    program instructions stored on the one or more computer readable storage media, the program instructions comprising:
    program instructions to monitor one or more communications between a pre-defined group of user profiles working on a project;
    program instructions to identify a first communication of the one or more communications between a first at least two user profiles of the pre-defined group;
    program instructions to determine that at least one user profile of the predefined group was not included in the first communication;
    program instructions to identify, using natural language processing, a first content of the first communication related to the project;
    program instructions to determine a degree of awareness to the first content of the first communication for each user profile of the pre-defined group, wherein the degree of awareness for a respective user profile is selected from the group consisting of the respective user profile was included in the first communication, the respective user profile opened the first communication, the respective user profile opened and read the first communication, and the respective user profile was not included in the first communication;
    program instructions to create a log for the first content, wherein the log identifies the first communication, the first at least two user profiles, and the degree of awareness of the first content for each user profile of the pre-defined group;

program instructions to identify a second communication between a second at least two user profiles of the pre-defined group;

program instructions to identify, using natural language processing, a second content of the second communication related to the project;

program instructions to determine that the second content of the second communication matches the first content of the first communication;

responsive to the program instructions to determine that the second content matches the first content, program instructions to add the second communication and the second at least two user profiles to the log for the first content;

program instructions to determine that the degree of awareness for one of the user profiles of the pre-defined group has changed;

responsive to the program instructions to determine that the degree of awareness for one of the user profiles has changed, program instructions to update the log for the first content to reflect the change in the degree of awareness; and program instructions to send the log to the pre-defined group of user profiles.

6. The computer program product of claim 5, wherein the program instructions to determine the degree of awareness for each user profile of the pre-defined group in regards to the first content of the first communication, comprises:

program instructions to determine a length of time that the first communication is opened by each user profile of the pre-defined group.

7. The computer program product of claim 5, wherein the program instructions to determine the degree of awareness for each user profile of the pre-defined group in regards to the first content of the first communication, comprises:

program instructions to determine a length of time that the first communication is viewed by each user profile of the pre-defined group, wherein the length of time is determined by tracking an eye gaze of each user profile of the pre-defined group.

8. The computer program product of claim 5, wherein the first communication and the second communication are selected from the group consisting of: an e-mail; an e-mail attachment; an instant messaging conversation; a telephone log; a telephone call; and a text message conversation.

9. A computer system for determining and displaying user awareness of information, the computer system comprising:
one or more computer processors;
one or more computer readable storage media; and
program instructions stored on the one or more computer readable storage media for execution by at least one of the one or more computer processors, the program instructions comprising:

program instructions to monitor one or more communications between a pre-defined group of user profiles working on a project;

program instructions to identify a first communication of the one or more communications between a first at least two user profiles of the pre-defined group;

program instructions to determine that at least one user profile of the predefined group was not included in the first communication;

program instructions to identify, using natural language processing, a first content of the first communication related to the project;

program instructions to determine a degree of awareness the first content of the first communication for each user profile of the pre-defined group, wherein the degree of awareness for a respective user profile is selected from the group consisting of the respective user profile was included in the first communication, the respective user profile opened the first communication, the respective user profile opened and read the first communication, and the respective user profile was not included in the first communication;

program instructions to create a log for the first content, wherein the log identifies the first communication, the first at least two user profiles, and the degree of awareness of the first content for each user profile of the pre-defined group;

program instructions to identify a second communication between a second at least two user profiles of the pre-defined group;

program instructions to identify, using natural language processing, a second content of the second communication related to the project;

program instructions to determine that the second content of the second communication matches the first content of the first communication;

responsive to the program instructions to determine that the second content matches the first content, program instructions to add the second communication and the second at least two user profiles to the log for the first content;

program instructions to determine that the degree of awareness for one of the user profiles of the pre-defined group has changed;

responsive to the program instructions to determine that the degree of awareness for one of the user profiles has changed, program instructions to update the log for the first content to reflect the change in the degree of awareness; and program instructions to send the log to the pre-defined group of user profiles.

10. The computer system of claim 9, wherein the program instructions to determine the degree of awareness for each user profile of the pre-defined group in regards to the first content of the first communication, comprises:

program instructions to determine a length of time that the first communication is opened by each user profile of the pre-defined group.

11. The computer system of claim 9, wherein the program instructions to determine the degree of awareness for each user profile of the pre-defined group in regards to the first content of the first communication, comprises:

program instructions to determine a length of time that the first communication is viewed by each user profile of the pre-defined group, wherein the length of time is determined by tracking an eye gaze of each user profile of the pre-defined group.

* * * * *